June 4, 1940.   C. A. MICHEL   2,203,502
SIDE LAMP ARRANGED FOR BEAM AND TURN INDICATION
Filed Oct. 24, 1936   4 Sheets-Sheet 1

Inventor
Clarence A. Michel
By Blackmore, Spencer & Flint
Attorneys

June 4, 1940. C. A. MICHEL 2,203,502
SIDE LAMP ARRANGED FOR BEAM AND TURN INDICATION
Filed Oct. 24, 1936 4 Sheets-Sheet 4

Inventor
Clarence A. Michel
By Blackmore, Spencer & Flint
Attorneys

Patented June 4, 1940

2,203,502

UNITED STATES PATENT OFFICE 2,203,502

SIDE LAMP ARRANGED FOR BEAM AND TURN INDICATION

Clarence A. Michel, Anderson, Ind., assignor to General Motors Corporation, Detroit, Mich., a corporation of Delaware Application October 24, 1936, Serial No. 107,320

1 Claim. (Cl. 177—329)

This invention relates to indicating and signalling means and more particularly to electrical circuits used in connection with directional signals and indicators making use of a two-filament bulb in the side or fender lamps of a vehicle. The indicating and signalling means of my invention makes use of indicator lights in the side or fender lamps adapted to burn with upper or lower beams of headlamps or combinations thereof, and means to give direction signals at the side or fender lights and if desired at the rear of the vehicle. The indicator lights also act as "side marker" lights along with the headlamp beams to indicate to approaching drivers the width of the vehicle.

In the operation of a vehicle it is desirable for the operator to have some means of conveniently signalling to others that the vehicle is about to turn to the right or left. Such signal preferably should be visible to others in either the front or rear of the vehicle. My invention contemplates the use of a visible signal, preferably of the flasher variety, by means of rear lamps and also by means of side or fender lamps for giving turn signals. In combination with this signalling means I provide means at the side of the vehicle and visible by the driver for indicating energization of certain of the beam-producing headlight filaments, said means being preferably associated with the turn signalling means at the side or fender lamps and acting as "side marker" lights and indicating the width of the vehicle to approaching drivers.

My direction signalling means and indicating means may be used in various lighting arrangements or combinations to indicate with desired headlamp beams or rays. For example, if desired the headlamps may be arranged in the conventional or "symmetrical" manner as by having means to provide an upper or driving beam, and a lower beam which may be used for city driving or when approaching other vehicles. My directional signalling and indicating means may be incorporated in such a headlamp lighting circuit as will become apparent as the description proceeds.

The means of my invention may also be incorporated with the "asymmetric" type of headlamp lighting circuit as described in the body of the specification in order to provide a means at the side of the vehicle for indicating desired beam arrangements. In combination with the indicating means I provide a means for signalling an intention of the operator to turn the vehicle in either direction.

One important feature of my invention is the use of a two filament bulb in the side lamps of the vehicle for signalling and indicating purposes.

Other features of my invention reside in the specific combinations and arrangements of parts and circuits as will become more apparent as the description proceeds. Reference is herein made to the drawings forming a portion of this specification, in which.

Figures 1, 2:
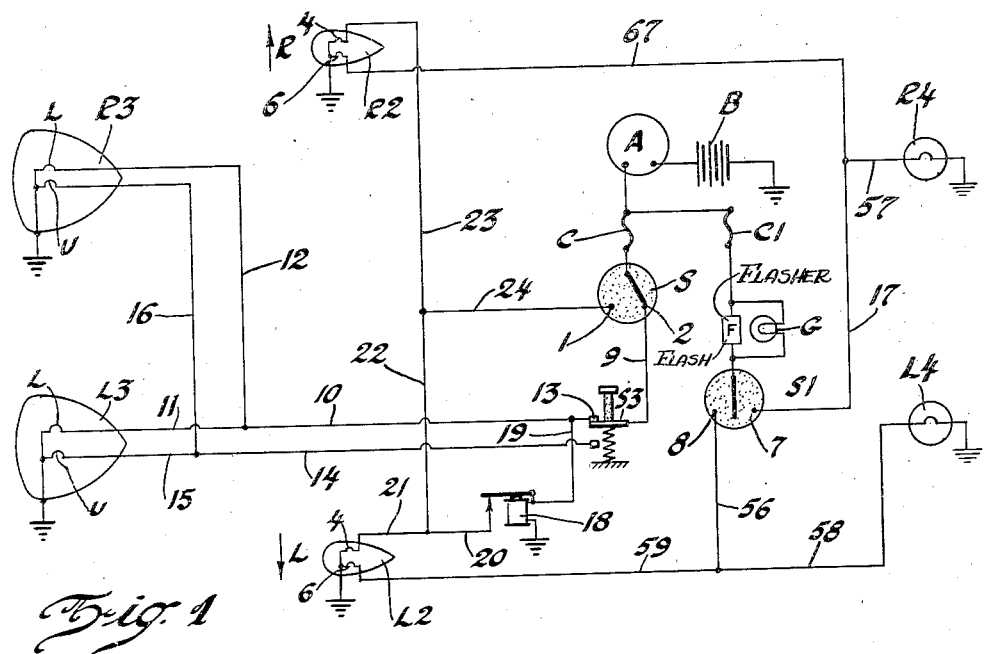
Figure 1 illustrates, somewhat diagrammatically, a symmetrical headlamp lighting circuit and circuit for directional signals and indicator lights in one form of my invention.
Figure 2 is a view generally similar to Figure 1 of an indicating and signalling means in connection with a three-beam asymmetrical headlamp lighting system.

In the several figures of the drawings A represents conventionally an ammeter in the circuit from a battery B or other source of electrical energy grounded to the frame or other portion of the vehicle. C, C1 are fuses in circuits leading from the battery to a main switch S and to a signalling switch S1 respectively. Each of the switches S and S1 may be located in any convenient position as, for example, the dash or steering column of the vehicle. If desired the switch S1 may be automatically operated by the movement of the steering mechanism.

Each switch S has a position 1 in which an electrical connection is made with the source of electrical energy and with the minor filaments 4, 4 of the bulbs of the two side lamps R2 and L2. Each lamp is grounded at any convenient position on the vehicle. By means of the circuits just described the minor filament of each bulb in the side lamps may act as a parking light when none is provided in the main headlamps R3 and L3. In addition, the minor filaments of the side indicator lamp bulbs may, by the use of other connections, act as a source of side indication along with headlamp beams.

The major filaments 6, 6 of the side indicator or fender lamp bulbs are adapted to act as a source of turn indication by means of an electrical circuit to the indicator or signalling switch S1, said switch being connected with the source of electrical energy B.

Rear turn signalling lights are indicated at R4 which is the right hand light and at L4 which is the left hand light. If desired an arrow or pointer may be used in conjunction with the side and rear indicating lights in order to signal the intention of the operator to turn the vehicle in either direction.

Switch S1 in each of the figures has a right signalling position 7 and a left signalling position 8. In position 7 the right hand rear signal lamp R4 and the major filament of the right side lamp R2 will be connected to a flasher F and indicator bulb G which in turn are connected to the source of electrical energy B. In position 8, lamps L4 and L2 will be similarly connected to the flasher F and indicating bulb G as shown. If desired, a plurality of the flasher F and indicating bulbs G may be provided as shown in Figure 2.

In Figure 1 of the drawings with the switch S in position 2 as indicated, the battery B or other source of electrical energy is connected by means of the circuit 9, 10, 11, 12 with the filaments L, L in the two head-lamps R3 and L3. The filaments L, L are adapted to give a lower or tilt beam for city driving or for meeting other cars. By depressing switch S3 the filaments U, U or those furnishing the main or upper beam will be connected by the circuit 9, 14, 15, 16 with the switch S and thus to battery B. Switch S3 is preferably a foot operated switch or, if desired, a hand operated switch may be used. The several filaments of the headlamps are grounded to the frame of the vehicle which completes the headlamp lighting circuits.

With switch S3 in the position 13 indicated in Figure 1 the minor filaments 4, 4 of the bulbs of the side indicator lamps will give a side indication along with the lower or tilt ray or beam of the headlamps by means of the relay 18 and circuit 19, 20, 21, 22 and 23. If desired the portion 19 of the circuit may be connected at the right of switch S3 instead of the left as shown in Figure 1, and the minor filaments 4, 4 will then give a side indication in either position of switch S3 and hence with either beam arrangement of the front headlamps.

With switch S in position 1 in Figure 1, the minor filaments 4, 4 will be supplied with power by means of circuit 24, 22 and 21 and thus act as parking lights. The relay 18 will open and block a current feed back when switch S is in position 1.

By means of switch S1 the flasher signal is adapted to indicate a right or left turn at the rear and side lamps as desired by the operator. A second or major filament 6 in each bulb of a side lamp is energized by means of the switch S1 and connections as shown. When switch S1 is in position 7 the rear signal lamp R4 and the major filament 6 of the side lamp bulb in lamp R2 will be energized from battery B by means of the circuit including the ammeter A, the flasher device F and indicating bulb G, switch S1, circuit elements 17, 57 and 67. When switch S1 is in position 8 elements 56, 58 and 59 complete the circuits from said switch to lamps L4 and L2 as will be apparent from Figure 1.

In Figure 2 the major filaments 6, 6 and rear lights are connected by means of electrical circuits and switch means S1 to the battery or electric power source B as in Figure 1. A separate flasher F and indicator bulb G are shown in each of the separate circuits 17, 57, 67 and 56, 58, 59 leading from the switch S1 to the right and left signalling lamps respectively. A single flasher and indicator bulb connected as in Figure 1 may be used if desired.

By means of selector switch S4, switch S3 and switch S and associated circuits, an asymmetric three-beam lighting circuit is provided. Switches S3 and S4 may conveniently be arranged as a single switch if desired.

In the asymmetric lighting system of the kind shown three combinations or arrangements of the headlamp beams are provided for. With switches S, S3, S4 in the positions shown in Figure 2 electrical energy will be supplied to the left headlamp as follows: circuit element 60, circuit element 61, contact portion 62 of switch S4, circuit element 63 to filament U of headlamp L3. By means of circuit 60, S3, 65, 66 and 68 the filament U of headlamp R3 will be energized. With the several switches in the positions shown in Figure 2 each of the two headlamp filaments U, U will thus be energized to provide an upper or driving beam.

With switches S and S4 in the positions shown in Figure 2 and with switch S3 in depressed position the electrical circuit to the left headlamp will remain the same as above described but that to the right hand lamp will be altered. In this instance the circuit will be as follows: 60, S3, 69, 70 and 71 to filament L in lamp R3. Thus the filament U in lamp L3 and filament L in lamp R3 will be energized. It will be understood that portions 62, 66 and 70 of switch S4 are electrically insulated from each other. Likewise it will be understood that lamp L3 provides the right portion of the beam and lamp R3 the left portion thereof.

With switches S and S3 in the positions shown in Figure 2 but with switch S4 moved upward the circuit to the left headlamp L3 from switch S will be as follows: 60, S3, 65, 66, 63 thus energizing filament U in said headlamp and the circuit to the right headlamp will be as follows: 60, 61, 62, 71, thus energizing filament L of lamp R3.

With switch S as shown in Figure 2, but with both of switches S3 and S4 moved to their other positions the circuits from the switch S to the left headlamp L3 is 60, S3, 69, 70, 72 while that to R3 is 60, 61, 62, 71. With this latter combination the filaments L, L of lamps R3 and L3 are energized and a lower beam is obtained.

From the above description it will be apparent that three arrangements or combinations of the headlamp beams may be obtained by use of the switch S3 and selector switch S4. As will readily appear, the beam from the left headlamp L3 will be directed upon and illuminate the right side of the highway and the beam from the right headlamp R3 will be directed upon and illuminate the left side of the highway.

As in the circuit of Figure 1 the minor filaments 4, 4 of the side indicator lamps are adapted to act as side indicators with each of the three beams of the front headlamps by means of circuits 25, 73, 74, 75. By moving switch S to parking position 1 the minor filaments also act as parking lights by means of circuits 76, 75, 74, 73, relay 25 preventing current feed back to the headlamp circuits.

Figure 3:
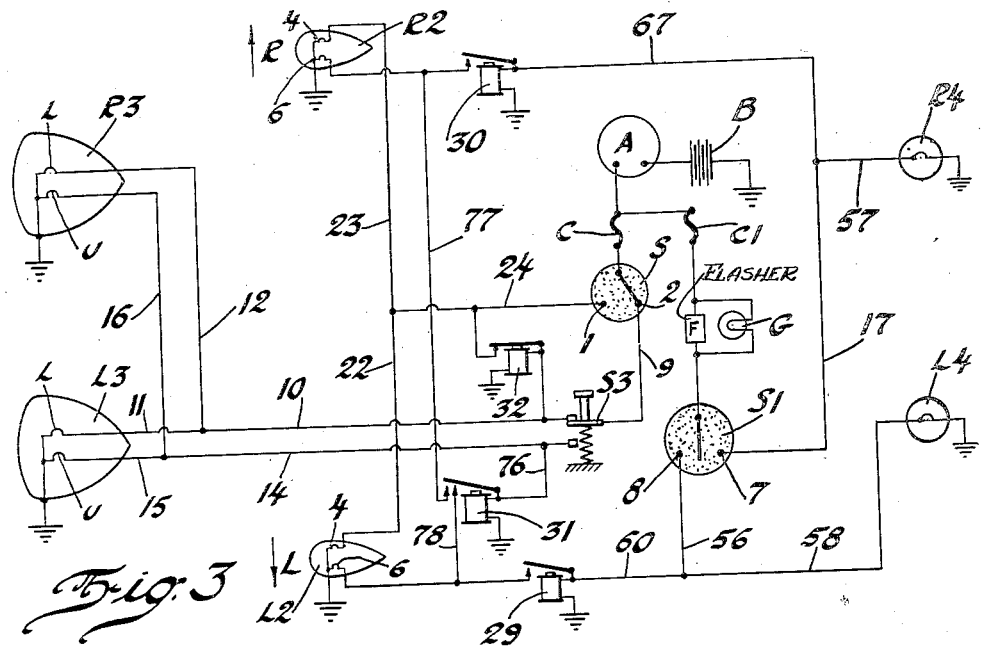
Figure 3 illustrates, somewhat diagrammatically, a headlamp circuit similar to Figure 1 in which the indicational and directional signals are changed with respect to filaments as compared with Figure 1.

In Figure 3 the portions of the circuits from switch S to the headlamps R3 and L3 are the same as in Figure 1 and are represented by the same reference numerals. Thus in the positions of switches S and S3 shown in Figure 3 the filaments L, L of each headlamp will be connected to switch S by means of elements 9, S3, 10, 11 and 12 as will be readily apparent. In the other position of switch S3 both of the filaments U, U will be connected to switch S by means of the elements 9, S3, 14, 15 and 16.

In position 1 of switch S in Figure 3 the minor filaments 4, 4 of each side lamp R2 and L2 act as parking lights by means of circuits 24, 22, 23. In the arrangement shown the major filaments 6, 6 act as the front turn signal means and also as the means for "side marker" indication with the upper beam to indicate to an approaching driver the width of the vehicle. The side marker indication is accomplished by means of element 76, relay 31, elements 77 and 78 when switch S is in position 2 shown in Figure 3 and switch S3 is in its other position than that shown in Figure 3. With switches S and S3 in the positions of Figure 3 the minor filaments 4, 4 act as the side marker by means of relay 32 between circuit elements 10 and 24, current passing in one direction through relay 32 and circuit elements 24, 23 and 22. Relay 32 opens and prevents current feed back when switch S is in parking position 1.

Relays 29 and 30 in side turn signalling means circuits 56, 60 and 17, 67 respectively permit the flasher signal current to pass in one direction to each of the major filaments 6, 6.

Figure 4:
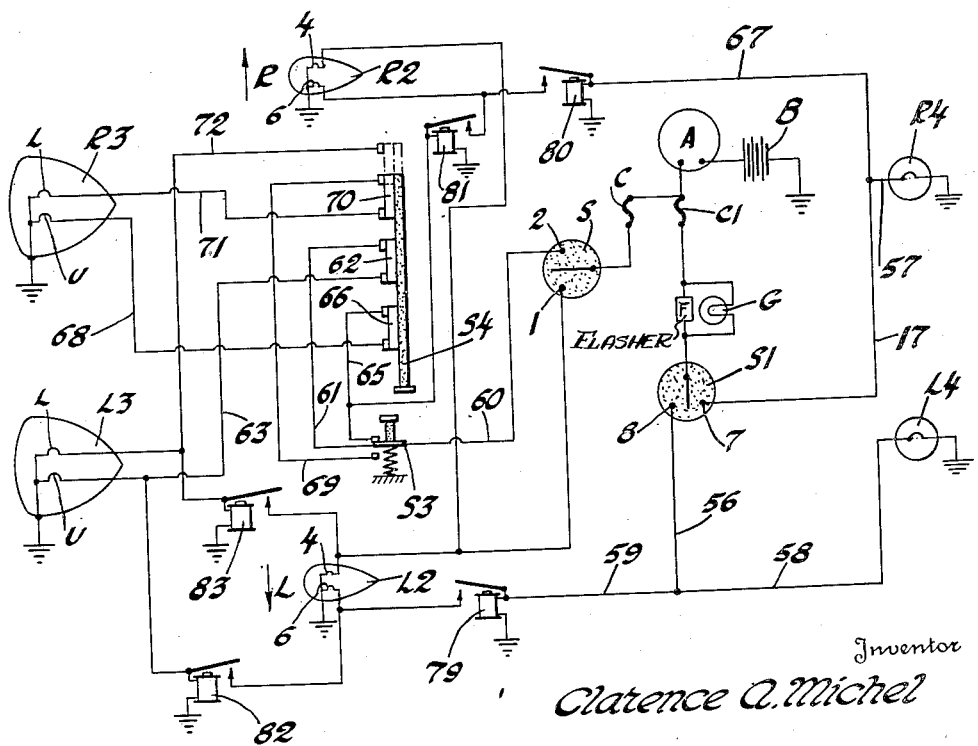
Figure 4 is a view generally similar to Figure 2, the indicational and directional signals being changed with respect to filaments.

Figure 4 shows the same general turn indicator setup and headlamp arrangement as Figure 2. Corresponding portions of the headlamp circuit and turn indicator circuits are designated by similar reference characters. Two dash or other switches S and S4 in conjunction with the switch S3 permit a three-beam asymmetric lighting arrangement having driving, meeting and lower beams as in the construction of Figure 2. The major filaments 6, 6 of the two side lamps are adapted to give turn signals by means of flasher F and bulb G, switch S1 and electrical circuits including relays 79 or 80. Relays 81 and 82 permit the major filaments to act also as a source of side indication in the driving and meeting beam and prevent the flasher signal current or other turn signal current from flowing to the front headlamps. Minor filaments 4, 4 of the side lamps serve as a source of side indication in the lower beam and for parking, relay 83 preventing current feed back when used as a parking light.

Figure 5:
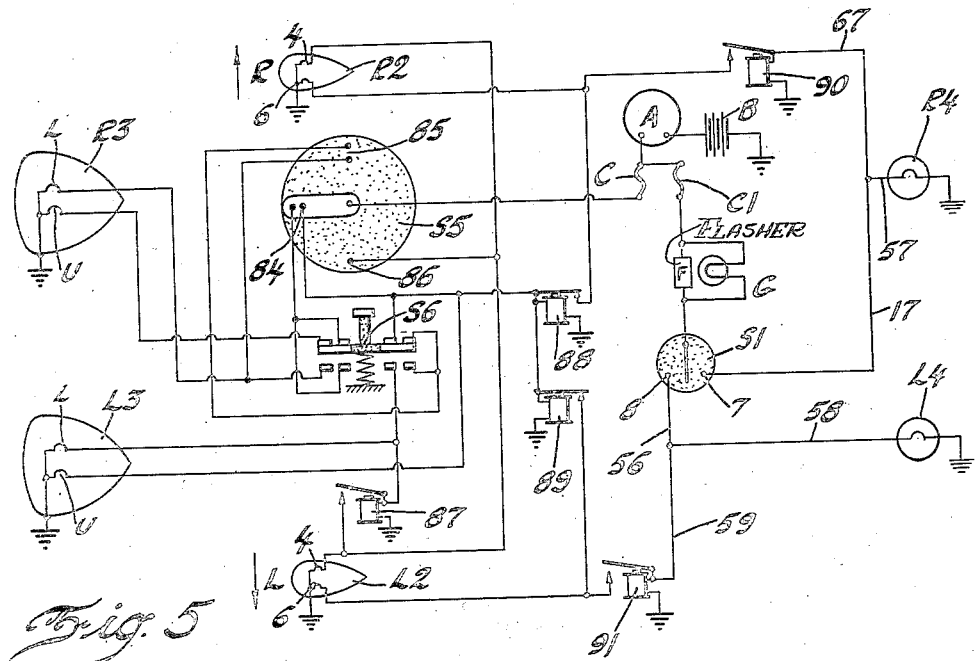
Figure 5 illustrates an asymmetrical three-beam headlight circuit in which a selector switch and a four point switch are used in conjunction with the directional and indicator signalling means.
Figure 7:
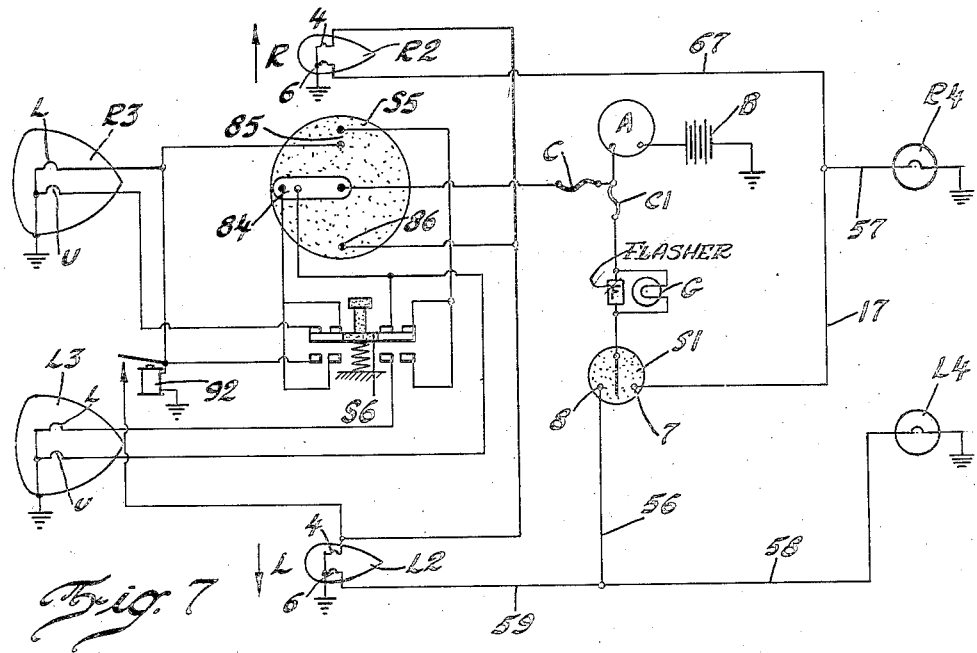
Figure 7 is a diagrammatic view of the device of my invention in which a four point foot or other switch and a selector switch are used in conjunction with an asymmetrical three-beam headlamp circuit and the directional and indicator signalling means, the indicational and directional signals being changed with respect to filaments as compared with Figure 5.

Figures 5 and 7 illustrate asymmetrical three-beam lighting systems, each using a dash or steering column selector switch S5 in conjunction with a four point switch S6 which may be foot operated if desired. The position 84 of the selector switch indicates the "country" or driving position in which filaments U, U of headlamps R3 and L3 are energized, while 85 indicates the "city" position. By moving switch S6 to the other of its two positions the meeting beam will result. The meeting beam utilizes filament U of lamp L3 and filament L of lamp R3. It will be understood that headlamp L3 furnishes the source of light for the right hand portion of the beam and that lamp R3 furnishes the left hand portion. By arranging the circuits as illustrated in Figure 5, the major filaments 6, 6 of the side indicator lamps serve as a source of side indication in the driving and meeting beams. In addition, the major filament acts as a source of turn indication with the directional signals.

The minor filament of each of the side lamps serves as a source of indication with the lower beam and as a parking indication when the selector switch is in the position 86 in Figure 5. Relays 87, 88 and 89 are arranged as will be clear from the drawing to prevent current feed back in the several switch positions. Each flasher or signalling circuit is arranged with a relay 90 or 91 which prevents current feed back into the signalling circuit from the lighting circuits.

The lighting circuit arrangement of the headlamps and switches therefor of Figure 7 are similar to Figure 5. The major filaments 6, 6 of either of the side or indicator lamps serve only as a source of turn indication. The minor filaments 4, 4 of the side lamps are adapted to act as a source of side indication with the several headlamp beam combinations. Relay 92 prevents current feed back when the switch S5 is in parking position 86 in which minor filaments are used as parking lights.

Figure 6:
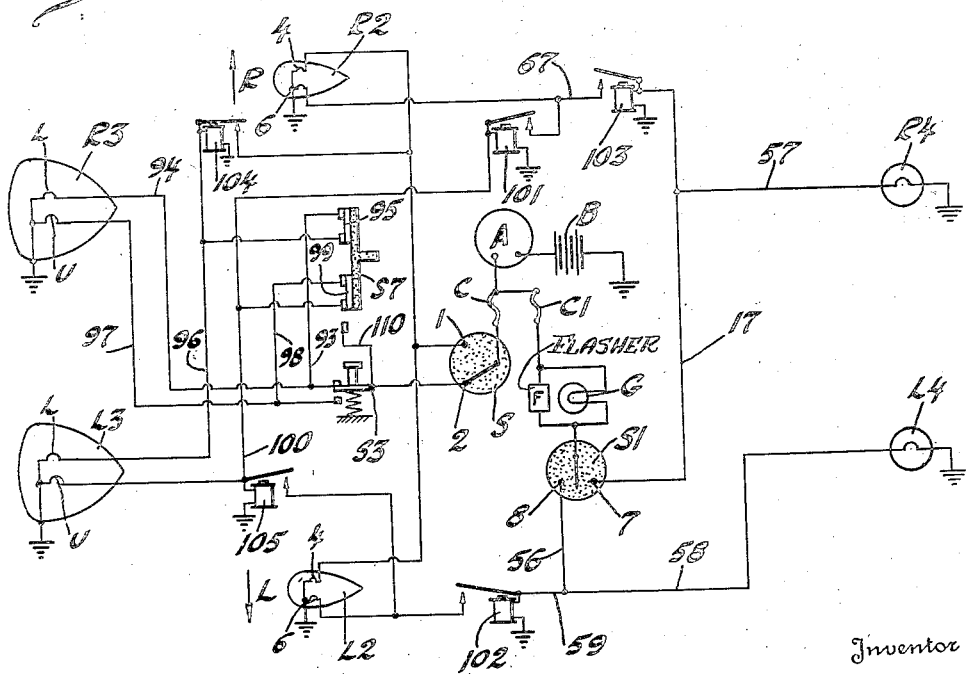
Figure 6 shows the headlamp circuits arranged so that either conventional or asymmetric beam arrangements may be had by moving the switches to different switch positions, in combination with means for giving directional signals and means for side indication.
Figure 8:
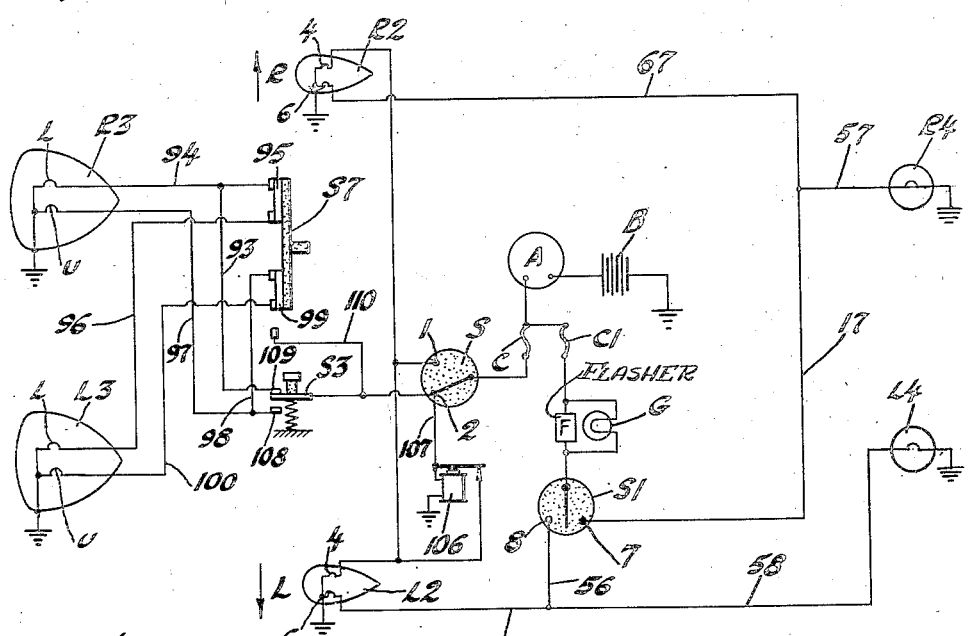
Figure 8 illustrates an arrangement generally similar to Figure 6 in which the signalling and indicating means are combined with headlamp circuits, so that either conventional or asymmetric arrangements of the beams may be obtained.

In Figures 6 and 8 I have shown the directional signal and indicating means in conjunction with two forms of headlamp lighting circuits whereby either "asymmetric" or "conventional" arrangements of headlamp beams may be had.

With the arrangements of Figures 6 and 8 and with switches S3 and S7 in the positions shown the two filaments L, L in the front headlamps will provide a lower or tilt beam by means of circuits 93, 94, 95, 96 thereto.

In the other position of switch S3 filaments U, U in the front headlamps will provide an upper or driving beam by means of circuits 97, 98, 99, 100. This is the so-called "conventional" arrangement. By moving selector switch S7 to the other of its two positions the circuits to the headlamps are such that the asymmetric form of lighting results. In this position of switch S7 with S3 as shown the circuits to the headlamps from switch S will be S3, 94 to filament L of headlamp R3 and 110, 99, 100 to filament U of headlamp L3. With both switches S3 and S7 in their second position the circuits to the headlamps from switch S will be S3, 97 to filament U of headlamp R3 and 110, 99, 100 to filament U of headlamp L3.

In Fig. 6, the filaments 6, 6 of the lamps R2 and L2 serve as the source of indication in the driving and meeting beam and also as the directional signal. Minor filaments 4, 4 of lamps R2 and L2 act as the source of indication in the lower beam of the headlamps and also as a parking light when switch S is in position 1. Electrical valves 101, 102, 103, 104, 105 arranged as shown in Figure 6 block the feed back of current in the several switch positions.

In Figure 8 the major filaments 6, 6 of lamps R2 and L2 act as the signal for indicating a turn in direction along with lamps R4 and L4. Minor filaments 4, 4 of lamps R2 and L2 act as the side indicating means and also as a parking light. I have shown in Figure 8 connections whereby the filaments 4, 4 act as the side indicational means in all the beam arrangements of headlamps. If desired, however, I may connect the portion 107 at the left of switch S3 at contact 108 or 109. If connected at 109 filaments 4, 4 will act as a source of side indication with the lower beam and meeting beam only, while if connected at 108 the filaments 4, 4 will act as a source of side indication with the upper beam only. Electric valve, or relay, 106 prevents current feed back when the switch S is in parking position.

In the several described systems it will be seen that I have provided a means for side indication with desired beam arrangements of the headlamps of a vehicle and means associated therewith for signalling the intention of the operator that he is about to turn the vehicle. The signal is preferably visible to others in both the front and rear by means of the side and rear signalling means provided. If desired, the signalling means may be automatically operated by having signal switch S1 arranged to be operated by movement of the steering mechanism. In each of the turn signalling circuits separate flasher means F and indicating bulbs G may be used if desired.

The several systems depicted in the drawings have been selected purely as illustrative examples. Numerous other arrangements will definitely appear to those skilled in the art upon familiarization with the concepts herein disclosed.

I claim:

An indicating lighting system for dirigible road vehicles comprising: a pair of headlamps, a pair of side lamps one closely adjacent each side margin of the vehicle and a pair of rear lamps, a source of electrical energy, and means subject to manual control for actuating said head, side and rear lamps to indicate the anticipated manoeuvring of the vehicle embracing such conditions as parking, turning, vehicle approach and passing, said last mentioned means consisting of a pair of incandescent filaments in each headlamp, one for producing a high beam and the other for producing a low beam said high beam filaments being energized from a common branch circuit and said low beam filaments being energized from another branch circuit which branch circuits are selectively energizable from a common trunk circuit, a major and a minor incandescent filament in each side lamp visible from the front of the vehicle, an incandescent filament, in each rear lamp, and selector switch means for simultaneously energizing either one or the other only of said major side lamp filaments in conjunction with a respective one or the other only of said rear lamp filaments, for energizing either the high or the low pair of filaments of said headlamps and for energizing the minor pair of said side lamp filaments independently or with a selected pair only of the headlamp filaments, said selector switch means comprising a three-position switch element for connecting one, the other, or neither of said major side lamp filaments (as well as a respective one, the other or neither of said rear lamp filaments) with said source of electrical energy, a second three-position switch for selectively directly connecting either the minor side lamp filaments or said headlamp trunk circuit with said source of electrical energy, a two-position switch element for connecting one or the other branch circuit to said trunk circuit, means including an automatic unidirectional relay for energizing said minor side lamp filaments from said headlamp trunk circuit only when said two-position switch effects energization of said low beam handicap branch circuit and precluding feed-back into said low beam branch circuit when said second three-position switch element is set for direct energization of said minor side lamp filaments, and a flashing element in circuit with said first-mentioned three-position switch element for insuring effective turn signalling from the major filaments of said side lamps even when the minor filaments of both side-lamps are energized from said low beam headlamp branch circuit through said relay.

CLARENCE A. MICHEL.

CERTIFICATE OF CORRECTION.

Patent No. 2,203,502.  June 4, 1940.

CLARENCE A. MICHEL.

It is hereby certified that error appears in the printed specification of the above numbered patent requiring correction as follows: Page 4, second column, line 38, in the claim, for the word "handicap" read --headlamp--; and that the said Letters Patent should be read with this correction therein that the same may conform to the record of the case in the Patent Office.

Signed and sealed this 2nd day of July, A. D. 1940.

(Seal)

Henry Van Arsdale,
Acting Commissioner of Patents.